United States Patent [19]
Vydra et al.

[11] Patent Number: 5,407,034
[45] Date of Patent: Apr. 18, 1995

[54] NOISE DAMPED BRAKE PAD ASSEMBLY

[75] Inventors: Edward J. Vydra, Northbrook; Gregory Pardus, Darien; Scott R. Dobrusky, Chicago; Michael R. Loth, Oak Lawn, all of Ill.

[73] Assignee: Pre Finish Metals Incorporated, Elk Grove Village, Ill.

[21] Appl. No.: 188,819

[22] Filed: Jan. 31, 1994

[51] Int. Cl.⁶ ............................................. F16D 69/00
[52] U.S. Cl. ............................ 188/73.37; 188/251 A; 188/250 B
[58] Field of Search .......... 188/251 R, 251 A, 251 M, 188/250 B, 250 C, 250 E, 264 G, 73.1, 73.31, 73.35, 73.37

[56] References Cited

U.S. PATENT DOCUMENTS

| | | | |
|---|---|---|---|
| 3,027,979 | 4/1962 | Pocock | 188/251 R |
| 3,477,551 | 11/1969 | Beuchle et al. | 188/250 B |
| 3,490,563 | 1/1970 | Hahm | 188/250 B |
| 3,885,651 | 5/1975 | Odier | 188/73.37 |
| 3,932,568 | 1/1976 | Watts et al. | 188/251 A |
| 4,240,530 | 12/1980 | Tillenburg | 188/264 G |
| 4,338,758 | 7/1982 | Hagbjer | 52/742 |
| 4,373,615 | 2/1983 | Melinat | 188/73.1 |
| 4,954,383 | 9/1990 | King et al. | 478/131 |
| 5,099,961 | 3/1992 | Dreilich et al. | 188/73.35 |
| 5,099,962 | 3/1992 | Furusu et al. | 188/73.1 |
| 5,141,083 | 8/1992 | Burgoon | 188/250 G |

FOREIGN PATENT DOCUMENTS 2713377 9/1977 Germany .
5655732 5/1981 Japan .

Primary Examiner—Matthew C. Graham
Assistant Examiner—Chris Schwartz
Attorney, Agent, or Firm—Emrich & Dithmar

[57] ABSTRACT

A disk brake pad assembly includes a rigid metal backing plate, a brake friction lining pad and a damping structure including a viscoelastic material disposed between the backing plate and the friction lining pad and fixed to each. In one embodiment the damping structure is a perforated metal plate having perforations filled with viscoelastic damping material. The damping plate may be provided along its opposite sides with constraining layers. Such a perforated damping structure may be disposed on either side of the backing plate.

14 Claims, 2 Drawing Sheets

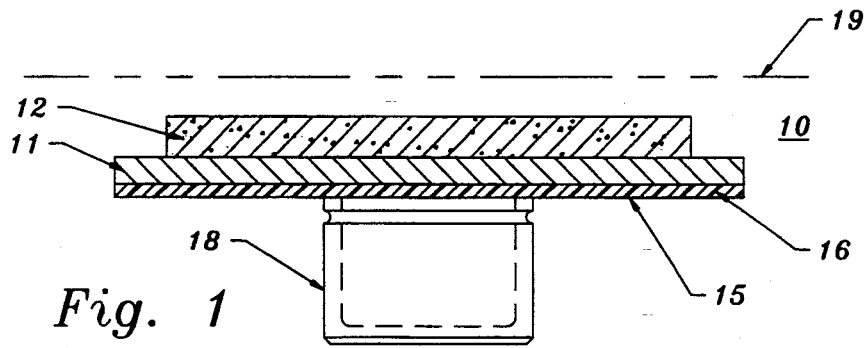
Fig. 1 (Prior Art)   Fig. 2 (Prior Art)
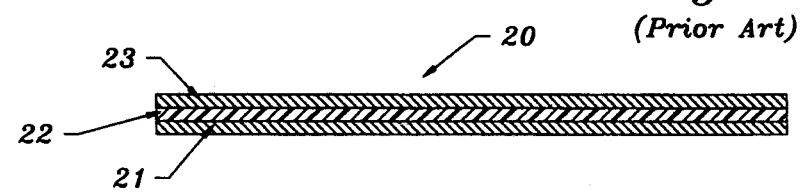
Fig. 3 (Prior Art)
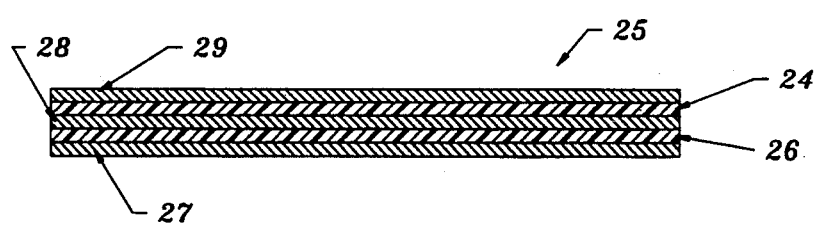
Fig. 4
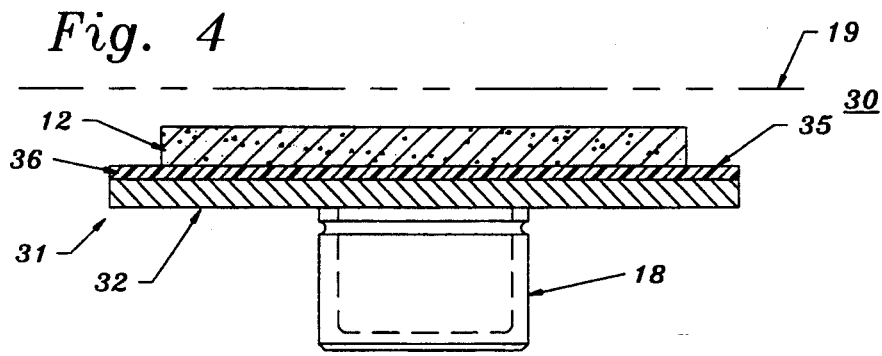
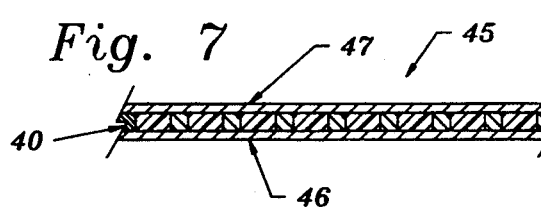
Fig. 6
Fig. 7
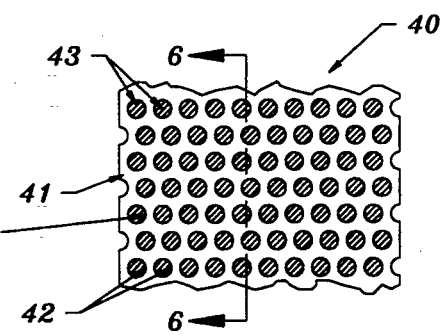
Fig. 5

NOISE DAMPED BRAKE PAD ASSEMBLY

BACKGROUND OF THE INVENTION

1. Field of the Invention

The present invention relates to damping structure for brake pad assemblies to inhibit brake squeal or noise, the invention having particular application to disk brakes.

2. Description of the Prior Art

In conventional brakes, particularly disk brakes, the frictional sliding between the brake shoe lining and the disk rotor may cause vibration of the brake shoe and of the other components coupled thereto, resulting in squealing or other noises. In order to suppress such noise, attempts have been made to fix a damping structure, including viscoelastic material, to the backing plate or shoe of the brake pad assembly to absorb or damp the noise-producing vibrations. Such damping structures have heretofore been provided on the outer or caliper side of the backing plate away from the friction lining.

The inventors of the present invention have determined that, for optimization of vibration damping performance, it is, in general, desirable for the damping structure to be disposed as closely as possible to the source of the vibrations, i.e., the interface between the rotor and the friction liner pad.

Applicants have further determined that the vibration or noise-damping performance of a damping structure, which is dependent on shearing of the viscoelastic material, is generally proportional to the surface area of the viscoelastic material. Heretofore, this surface area has been limited by the surface area of the backing plate to which the damping structure is attached.

Also, in prior damping arrangements which have been disposed on the outer surface of the backing plate, i.e., between the backing plate and the force-applying piston or caliper, the backing structure is subjected to torsional or rotational forces which can adversely affect performance. Furthermore, the area of contact with the piston is typically substantially less than the overall area of the damping structure. Thus, the damping structure has a tendency to become squeezed or compressed at the area of contact with the piston and has a tendency to lift or separate from the backing plate along the periphery thereof. Such prior damping arrangements have, in general, provided inadequate noise damping, particularly at lower frequencies.

SUMMARY OF THE INVENTION

It is a general object of the present invention to provide an improved brake pad assembly which avoids the disadvantages of prior assemblies while affording additional structural and operating advantages.

An important feature of the invention is the provision of a brake pad assembly with a damping structure which is placed as close as possible to the source of noise-producing vibrations.

In connection with the foregoing feature, a further feature of the invention is the provision of a brake pad assembly of the type set forth, wherein the damping structure is disposed between the backing plate and the friction liner pad.

A further feature of the invention is the provision of a brake pad assembly of the type set forth, which has a damping structure which increases the surface area of the viscoelastic damping material.

Yet another feature of the invention is the provision of a brake pad assembly of the type set forth which optimizes vibration or noise-damping effectiveness over a wide range of frequencies.

Still another feature of the invention is the provision of a brake pad assembly of the type set forth which minimizes torsional and rotational forces on the damping structure and which inhibits separation of the damping structure from the backing plate.

Yet another feature of the invention is the provision of a brake pad assembly of the type set forth, which is of simple and economical constructions.

Certain ones of these and other features of the invention are attained by providing a brake pad assembly comprising: a rigid backing plate, a brake friction lining pad, and a damping structure including a viscoelastic material disposed between said backing plate and said friction lining pad and fixedly secured to each.

Other features of the invention are attained by providing a brake pad assembly comprising: a brake shoe structure including a rigid backing structure and a friction lining pad carried by said backing structure; and said backing structure having a plurality of perforations formed therein, and viscoelastic damping material disposed in said perforations.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a sectional view of a prior art brake pad assembly incorporating a damping structure and illustrating an associated piston;

FIG. 2 is an enlarged sectional view of a prior art damping structure which could be substituted for the damping structure of FIG. 1;

FIG. 3 is a view similar to FIG. 2 of another alternative prior art damping structure which could be substituted for the damping structure of FIG. 1;

FIG. 4 is a view similar to FIG. 1, illustrating a brake pad assembly in accordance with the present invention;

FIG. 5 is a fragmentary top plan view of another embodiment of damping structure in accordance with the present invention;

FIG. 6 is an enlarged, fragmentary view in vertical section taken along the line 6—6 in FIG. 5;

FIG. 7 is a sectional view similar to FIG. 6, of another embodiment of damping structure in accordance with the present invention;

DESCRIPTION OF THE PREFERRED EMBODIMENTS

Figure 8:
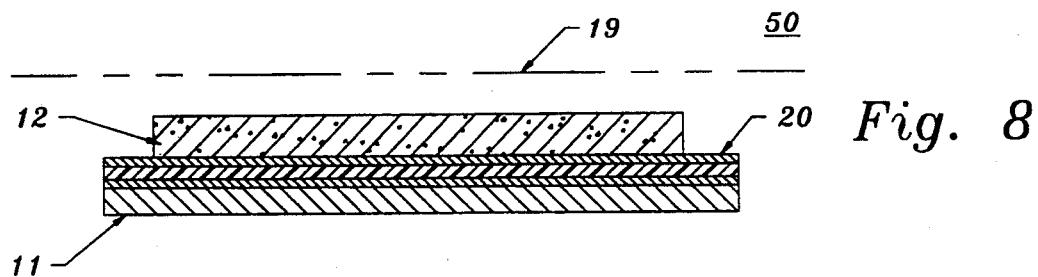
FIG. 8 is a view similar to FIG. 4 of the brake pad assembly incorporating the damping structure of FIG. 2.

Referring to FIG. 1, there is illustrated a prior art brake pad assembly 10 including a backing plate 11, which is typically formed of a suitable metal, and a friction liner pad 12 of known construction fixed to one side of the backing plate 11, as by a suitable bonding agent. Fixed to the opposite side of the backing plate 11 is a damping structure 15 which, in this instance, comprises a single damping layer 16 of a suitable viscoelastic material designed for absorbing or damping noise-creating vibrations. A number of known viscoelastic materials could be used, including acrylic or silicon polymers, fluoropolymers, nitrile rubber and the like. The associated brake assembly, which may be a disk brake assembly, is provided with a piston 18 which bears against the damping structure 15 for urging the brake pad assembly 10 into frictional sliding engagement with the surface 19 of a rotating disk brake rotor, all in a known manner. As can be seen, the piston 18 is typically cup-shaped, making only peripheral contact with the damping structure 15, and it also typically has an overall area substantially less than that of the damping structure 15.

Referring to FIG. 2, there is illustrated a prior art damping structure 20 which can be substituted for the damping structure 15 in the brake pad assembly 10. More specifically, the damping structure 20 is multi-layered, including an outer metal layer 21, a damping layer 22 of viscoelastic material, which may be substantially the same as the damping layer 16, and an inner metal layer 23, the layers preferably being bonded together in a suitable manner. In FIG. 3 there is illustrated another alternative prior art damping structure 25, which is similar to the damping structure 20 except it is provided with two damping layers. More specifically, the damping structure 25 includes damping layers 24 and 26 alternating with an outer metal layer 27, a middle metal layer 28 and an inner metal layer 29. It will be appreciated that the damping layers 24 and 26 may, respectively, be formed of different types of viscoelastic material having different thermal efficiencies, for example.

It should be noted that the drawing figures are not to scale and the layer thicknesses shown are simply to facilitate illustration. Typically, the friction liner pad 12 has a thickness of approximately ⅜ inch, the backing plate 11 has a thickness in the range of from about 0.160 inch to about 0.240 inch, and each of the damping structures 15, 20, and 25 has an overall thickness no greater than about 0.040 inch.

A disadvantage of the prior art brake pad assembly 10 is that, since the piston 18 bears directly against the damping structure 15, the damping layer 16 is subjected to significant torsional and rotational forces which can degrade it and impair noise-damping effectiveness. Also, the localized engagement of the piston 18 with the damping layer 16 tends to locally compress it during a braking operation, which can permanently deform it and also tends to promote separation of the damping layer 16 from the backing plate 11 around the periphery thereof. The prior art brake pad assembly 10 has been found to provide insufficient noise damping at lower frequencies. These disadvantages are also exhibited if the damping structures 20 or 25 are used in the brake pad assembly 10 since, while the piston 18 does not directly contact the viscoelastic material in those structures, the metal layers 21 or 27 are extremely thin.

In operation, the noise damping is effected by a shearing action in the viscoelastic layers 16, 24 and 26 which converts a part of the mechanical vibrational energy into heat, thereby reducing noise. It has been found that this shearing, noisereducing action is a function of the proximity of the damping layer to the source of noise-producing vibrations, i.e., the interface between the friction liner pad 12 and the rotor surface 19. Accordingly, a fundamental aspect of the present invention is relocation of the damping structure to a position closer to the source of the noise vibrations.

Thus, referring to FIG. 4, there is illustrated a brake pad assembly 30 in accordance with the present invention, which includes a backing structure 31 made up of a rigid backing plate 32, which may be formed of any suitable material such as metal, graphite or the like, and a damping structure 35. The damping structure 35 is disposed between the backing plate 32 and a friction liner pad 12, and is fixedly secured to each by suitable means. The damping structure 35 may comprise a single damping layer of a suitable viscoelastic material, which may be of the same type as the damping layer 16 described in connection with FIG. 1. It will be appreciated that in this embodiment the piston 18 bears directly against the outer or reverse side of the backing plate 32, which is rigid and substantially incompressible. Thus, the force of the piston 18 is spread evenly across the entire area of the damping layer 36 and does not locally compress it. Furthermore, the even distribution of the piston force serves to inhibit any separation of the damping layer 16 from the backing plate 32 around the periphery thereof. Most importantly, the location of the damping structure 35 directly against the friction liner pad 12 places it closer to the source of vibrations and, thereby, enhances the noise damping effectiveness of the damping structure 35, since it will tend to increase the shear in the damping layer 36, converting more of the vibrational mechanical energy into heat. Thus, it will be appreciated that the damping layer 36 will preferably utilize a type of viscoelastic material which operates effectively at the higher temperatures which will result from its increased proximity to the rotor surface 19.

It has also been determined that the noise-damping effectiveness of the viscoelastic material is a function of its total surface area. In the prior art brake pad assembly 10, the surface area of the damping layer 16 is limited by the surface area of the backing plate 11. Another fundamental aspect of the present invention is the provision of a damping structure which greatly increases the effective surface area of the viscoelastic damping material. Referring to FIGS. 5 and 6, there is illustrated a damping structure 40 constructed in accordance with this aspect of the present invention. The damping structure 40 includes a damping plate 41, which may be formed of a suitable metal, such as aluminum, provided with a plurality of perforations 42 therethrough. In the illustrated embodiment, each of the perforations 42 is circular in shape, the perforations 42 being arranged in staggered rows and columns and substantially uniformly distributed over the entire area of the damping plate 41. In a constructional model of the invention, the damping plate 41 is formed of AKDQ (aluminum killed drawing quality) having a thickness of about 0.012 inch, each of the perforations 42 having a 0.078-inch diameter, with the centers of adjacent perforations 42 being spaced apart about 0.109 inch, such that the perforations 42 combine to provide a total free or open area approximately 47% of the total area of the damping plate 41. A suitable viscoelastic damping material is disposed in each of the perforations 42, resulting in a plurality of discrete viscoelastic bodies 43. The bodies 43 may be formed of any suitable viscoelastic material but, in constructional models of the invention have been formed of silicone or of an ionomer resin such as that sold by E. I. Du Pont de Nemours & Co. under the trade name "SURLYN". The viscoelastic material is illustrated as completely filling the perforations 42 for the entire thickness of the damping plate 41, but the damping bodies 43 could have a lesser thickness than the plate 41. It will be appreciated that, because of the circumferential cylindrical surface areas of each of the viscoelastic bodies 43, the total surface area afforded by the viscoelastic material in the damping structure 40 is substantially increased over that of the damping structure 35, thereby providing further enhancement in the noise-damping effectiveness of the damping structure 40.

Referring to FIG. 7, there is illustrated a modified damping structure 45, which includes the damping structure 40 of FIGS. 6 and 7 and is additionally provided with containment layers 46 and 47, respectively covering the opposite sides of the damping plate 41, and serving to more effectively contain the viscoelastic bodies 43. The containment layers 46 and 47 may be formed of suitable relatively incompressible materials, such as aluminum foil or a flexible graphite material, such as that sold by Polycarbon, Inc. under the trade designation "CALGRAPH".

Figure 9:
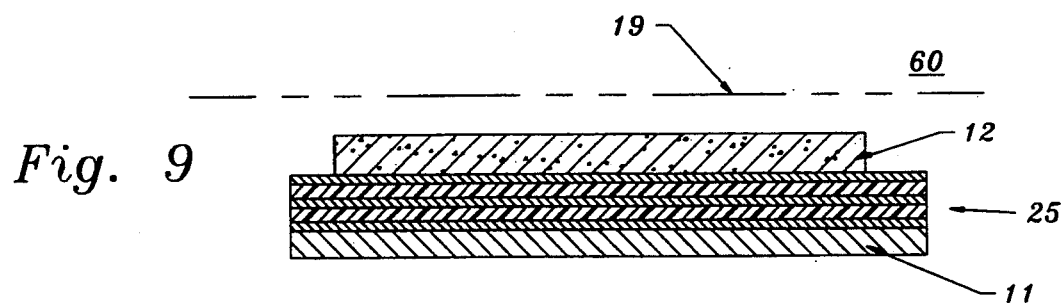
FIG. 9 is a view similar to FIG. 4 of the brake pad assembly incorporating the damping structure of FIG. 3.

Referring now to FIG. 8, there is illustrated a brake pad assembly 50, which is substantially the same as the brake pad assembly 30, except that there has been substituted for the single-layer damping structure 35 the damping structure 20 of FIG. 2. In FIG. 9 there is illustrated another brake pad assembly 60, which is the same as the brake pad assembly 30 except that there has been substituted for the damping structure 35 the damping structure 25 of FIG. 3. It will be appreciated that any of a variety of prior art damping structures could be incorporated in the brake pad assembly 30 of FIG. 4 and, by reason of their improved placement in accordance with the present invention, will achieve similarly improved results.

Figure 10:
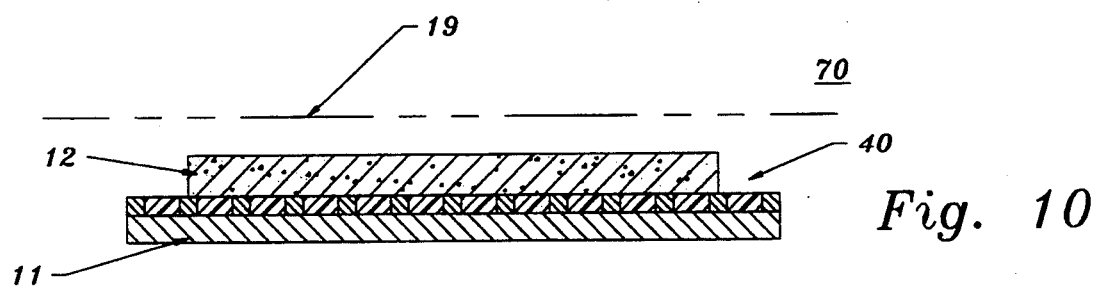
FIG. 10 is a view similar to FIG. 4 of the brake pad assembly incorporating the damping structure of FIG. 5.
Figure 11:
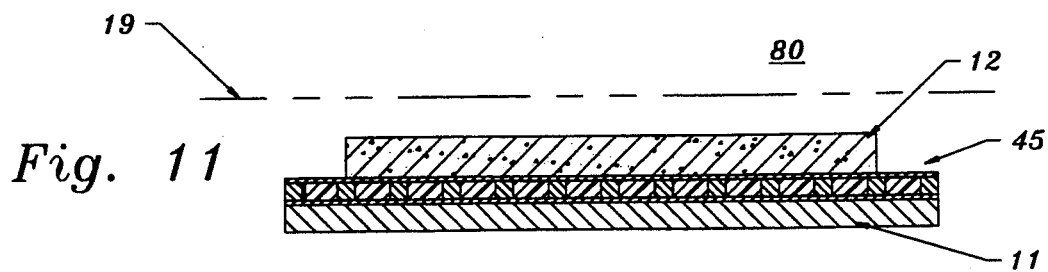
FIG. 11 is a view similar to FIG. 4 of the brake pad assembly incorporating the damping structure of FIG. 7.

In FIG. 10 there is illustrated a brake pad assembly 70, which is substantially the same as the brake pad assembly 30 of FIG. 4, except there had been substituted for the damping structure 35 the perforated damping structure 40 of FIGS. 5 and 6. In FIG. 11 there is illustrated a brake pad assembly 80, which is a modified form of the brake pad assembly 30 of FIG. 4 in which there is substituted for the damping structure 35 the damping structure 45 of FIG. 7. While the brake pad assemblies 70 and 80 utilize the perforated damping structures 40 and 45 in the position proximate the friction liner pad 12, it will be appreciated that, because of their improved noise-damping effectiveness, they may also be used on the opposite side of the backing plate 32 against the piston 18 and will still provide an improved performance as compared with the prior art brake pad assembly 10.

In a constructional model of the invention, the damping structure 45 of FIG. 7 utilized a 0.012 thick AKDQ damping plate 41, with the perforations 42 thereof filled with a SURLYN resin, and with the containment layers 46 and 47, respectively comprising 0.010-thick flexible graphite layers adhesively secured to the damping plate 41 by 0.001-thick SURLYN resin films, resulting in a damping structure 45 having a total thickness of 0.034 inch.

In another constructional model of the damping structure 45, the damping plate 41 was an AKDQ plate of 0.012-inch thickness with the perforations 42 filled with silicone. The containment layers 46 and 47 were each 0.004-inch-thick aluminum foil, adhesively secured to the damping plate 41 by 0.001-inch-thick films of a suitable silicone adhesive, such as that sold by FLEXCON under the trade designation "DENSIL 1078". Thus, the damping structure 45 had an overall thickness of 0.025 inch.

From the foregoing, it can be seen that there has been provided an improved brake pad assembly and damping structure therefor, wherein the damping structure is located immediately adjacent the friction liner pad so as to minimize compression of the damping layer and separation from the backing plate. There has also been provided a damping structure with a significantly increased surface area and increased noise damping effectiveness.

We claim:

1. A brake pad assembly comprising: a brake shoe structure including a rigid backing structure and a friction lining pad carried by said backing structure; said backing structure having a plurality of perforations formed therein, said backing structure including a rigid imperforate backing plate, a damping plate having said perforations formed therethrough and fixed to said backing plate, metal constraining layers respectively disposed along the opposite sides of said damping plate, and viscoelastic damping material disposed only in said perforations.

2. The brake pad assembly of claim 1, wherein said backing structure includes a metal plate in which said perforations are formed.

3. The brake pad assembly of claim 1, wherein said perforations are substantially uniformly distributed over the area of said backing structure.

4. The brake pad assembly of claim 1, wherein each of said perforations is circular in shape.

5. The brake pad assembly of claim 1, wherein said damping material is silicone.

6. The brake pad assembly of claim 1, wherein said damping material is an ionomer resin.

7. The brake pad assembly of claim 1, and further comprising means bonding said constraining layers to said damping plate.

8. The brake pad assembly of claim 1, wherein each of said constraining layers is formed of aluminum.

9. A brake pad assembly comprising: a rigid metal backing plate; a brake friction lining pad; and a damping structure disposed between said backing plate and said friction lining pad and fixedly secured directly to each, said damping structure including a damping plate having a plurality of perforations formed therethrough, two metal constraining layers respectively disposed along the opposite sides of said damping plate, and viscoelastic damping material disposed only in said perforations.

10. The brake pad assembly of claim 9, wherein said damping material is silicone.

11. The brake pad assembly of claim 9, wherein said damping material is an ionomer resin.

12. The brake pad assembly of claim 9, wherein said damping structure further includes bonding layers respectively fixedly securing said constraining layers to said damping plate.

13. The brake pad assembly of claim 9, wherein said viscoelastic damping material fills said perforations for the entire thickness of said damping plate.

14. A brake pad assembly comprising: a brake shoe structure including a rigid backing structure and a friction lining pad carried by said backing structure; said backing structure having a plurality of perforations formed therein, said backing structure including a rigid imperforate backing plate, a damping plate having said perforations formed therethrough and fixed to said backing plate, graphite constraining layers respectively disposed along the opposite sides of said damping plate, and viscoelastic damping material disposed only in said perforations.

* * * * *